United States Patent
Amit et al.

(10) Patent No.: US 9,792,350 B2
(45) Date of Patent: Oct. 17, 2017

(54) REAL-TIME CLASSIFICATION OF DATA INTO DATA COMPRESSION DOMAINS

(71) Applicant: INTERNATIONAL BUSINESS MACHINES CORPORATION, Armonk, NY (US)

(72) Inventors: Jonathan Amit, Omer (IL); Lilia Demidov, Ness-Tziona (IL); George Goldberg, Bat Yam (IL); Nir Halowani, Holon (IL); Danny Harnik, Tel Mond (IL); Chaim Koifman, Rishon Lezion (IL); Sergey Marenkov, Yehud (IL); Oded Margalit, Ramat Gan (IL); Kat I. Ronen, Kfar-Saba (IL); Dmitry Sotnikov, Givataim (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 65 days.

(21) Appl. No.: 13/738,333

(22) Filed: Jan. 10, 2013

(65) Prior Publication Data
US 2014/0195499 A1    Jul. 10, 2014

(51) Int. Cl.
*G06F 17/00* (2006.01)
*G06F 17/30* (2006.01)

(52) U.S. Cl.
CPC .. *G06F 17/30598* (2013.01); *G06F 17/30315* (2013.01)

(58) Field of Classification Search
CPC ........................................................ G06F 17/30
See application file for complete search history.

(56) References Cited

U.S. PATENT DOCUMENTS

| | | | |
|---|---|---|---|
| 5,486,826 A | 1/1996 | Remillard | |
| 5,532,692 A | 7/1996 | Tatsuya | |
| 5,546,477 A | 8/1996 | Knowles et al. | |
| 5,675,789 A | 10/1997 | Ishii et al. | |
| 5,701,463 A * | 12/1997 | Malcolm ............... | G06F 9/4425 707/758 |
| 5,768,445 A | 6/1998 | Troeller et al. | |
| 6,049,797 A | 4/2000 | Guha et al. | |

(Continued)

FOREIGN PATENT DOCUMENTS

| | | |
|---|---|---|
| CN | 1777038 A | 5/2006 |
| CN | 1949670 A | 4/2007 |

(Continued)

OTHER PUBLICATIONS

Diner, "Competitive Parallel Processing for Compression of Data," NTIS Tech Notes 2301, p. 379 (May 1, 1990).*

(Continued)

*Primary Examiner* — Apu Mofiz
*Assistant Examiner* — Farhad Agharahimi
(74) *Attorney, Agent, or Firm* — Griffiths & Seaton PLLC (57) ABSTRACT

For real-time classification of data into data compression domains, a decision is made for which of the data compression domains write operations should be forwarded by reading randomly selected data of the write operations for computing a set of classifying heuristics thereby creating a fingerprint for each of the write operations. The write operations having a similar fingerprint are compressed together in a similar compression stream.

15 Claims, 4 Drawing Sheets

(56) References Cited

U.S. PATENT DOCUMENTS

| | | | |
|---|---|---|---|
| 6,055,339 | A | 4/2000 | Wilkinson |
| 6,195,024 | B1 | 2/2001 | Fallon |
| 6,253,264 | B1 * | 6/2001 | Sebastian ............... G06T 9/005 |
| | | | 341/107 |
| 6,309,424 | B1 | 10/2001 | Fallon |
| 6,339,616 | B1 | 1/2002 | Kovalev |
| 6,624,761 | B2 | 9/2003 | Fallon |
| 6,731,814 | B2 | 5/2004 | Zeck et al. |
| 6,947,483 | B2 | 9/2005 | Engwer |
| 7,161,506 | B2 | 1/2007 | Fallon |
| 7,281,004 | B2 | 10/2007 | Lightstone et al. |
| 7,378,992 | B2 | 5/2008 | Fallon |
| 7,551,787 | B2 | 6/2009 | Marks |
| 7,719,443 | B1 | 5/2010 | Natanzon |
| 7,773,731 | B2 | 8/2010 | Malik et al. |
| 7,774,456 | B1 * | 8/2010 | Lownsbrough ......... H04L 41/22 |
| | | | 709/217 |
| 7,930,436 | B1 | 4/2011 | Znosko |
| 8,295,615 | B2 | 10/2012 | Celi, Jr. |
| 8,306,956 | B2 | 11/2012 | Livshits |
| 8,676,725 | B1 * | 3/2014 | Lin ...................... G06N 99/005 |
| | | | 706/12 |
| 8,712,978 | B1 | 4/2014 | Shilane et al. |
| 8,738,838 | B2 | 5/2014 | Cho et al. |
| 2001/0038347 | A1 | 11/2001 | Avery et al. |
| 2001/0054131 | A1 | 12/2001 | Alvarez, II et al. |
| 2002/0028021 | A1 | 3/2002 | Foote et al. |
| 2002/0198863 | A1 * | 12/2002 | Anjur ................ G06F 17/30536 |
| 2003/0030575 | A1 | 2/2003 | Frachtenberg et al. |
| 2004/0001160 | A1 | 1/2004 | Herley |
| 2004/0228533 | A1 | 11/2004 | Adelmann |
| 2005/0135690 | A1 | 6/2005 | Golla et al. |
| 2005/0192978 | A1 | 9/2005 | Lightstone et al. |
| 2006/0106867 | A1 | 5/2006 | Burges et al. |
| 2006/0232593 | A1 | 10/2006 | Lai et al. |
| 2008/0279462 | A1 | 11/2008 | Celi, Jr. |
| 2009/0052784 | A1 | 2/2009 | Covell et al. |
| 2009/0070357 | A1 | 3/2009 | Oh et al. |
| 2010/0030797 | A1 | 2/2010 | Johnson et al. |
| 2010/0070543 | A1 * | 3/2010 | Backa .................... G06F 21/50 |
| | | | 707/821 |
| 2010/0121826 | A1 | 5/2010 | Mitsuhashi |
| 2010/0161650 | A1 | 6/2010 | Chaitanya et al. |
| 2010/0189351 | A1 | 7/2010 | Mattausch et al. |
| 2010/0325094 | A1 | 12/2010 | Yang et al. |
| 2011/0252183 | A1 | 10/2011 | Cho et al. |
| 2011/0285559 | A1 | 11/2011 | Fallon |
| 2012/0001777 | A1 | 1/2012 | Litvak |
| 2012/0124105 | A1 | 5/2012 | Provenzano |
| 2012/0207216 | A1 | 8/2012 | Yu et al. |
| 2012/0278884 | A1 * | 11/2012 | Menoher ............... G06F 21/564 |
| | | | 726/22 |
| 2013/0179659 | A1 | 7/2013 | Seo et al. |
| 2013/0254441 | A1 | 9/2013 | Kipnis et al. |
| 2013/0275396 | A1 | 10/2013 | Condict et al. |
| 2014/0195497 | A1 | 7/2014 | Amit et al. |
| 2014/0195498 | A1 | 7/2014 | Asher et al. |
| 2014/0195500 | A1 | 7/2014 | Amit et al. |
| 2015/0234852 | A1 | 8/2015 | Amit et al. |
| 2015/0317381 | A1 | 11/2015 | Amit et al. |

FOREIGN PATENT DOCUMENTS

| | | |
|---|---|---|
| CN | 101068358 A | 11/2007 |
| WO | 2014108818 A1 | 7/2014 |

OTHER PUBLICATIONS

INSPEC: Real-Time Network Streaming of Dynamic 3D Content with In-frame and Inter-frame Compression AN-12316686; Gasparello, PS. et al.; 2011.

Ip.com: Efficient Monitoring of Plan Execution CPU Costs in a Database Server IBM; Sep. 25, 2009.

Ip.com: Methods for measuring the CPU overhead of a transaction oriented monitoring tool IBM; Jan. 19, 2006.

Coyne, L. et al.; "IBM System Storage N series Data Compression and De-duplication Data ONTAP 8.1 Operating in 7-Mode"; IBM Corporation, www.ibm.com/redbooks/sg248033; Jul. 2012.

Moerti, DF. et al.; "Direct Access Storage Device Compression and Decompression Data Flow"; http://www.ip.com/pubview/IPCOM000116855D; Mar. 31, 2005.

Ruei-Sung Lin et al., "SPEC Hashing: Similarity Preserving Algorithm for Entropy-based Coding," Computer Vision and Pattern Recognition (CVPR), 2010 IEEE Conference, Jun. 13, 2010 (7 pages).

Nobuyoshi Sato et al., "Target Selection by Similarity Preserve Hash in Distributed System for Geographical Origin Identification of Vegetables," Advanced Information Networking and Applications, 20th International Conference on (vol. 1), IEEE, Apr. 18, 2006 (6 pages).

Papaefstathiou, Ioannis, "Accelerating ATM: On-line Compression of ATM Streams", Feb. 12, 1999, pp. 233-239, PCCC 1999, Scottsdale, AZ.

"Object Specific Image Reconstruction using a Compressive Sensing Architecture for Application in Surveillance Systems" pp. 1167-1180, IEEE Transactions on Aerospace and Electronic Systems, vol. 45, No. 3, Jul. 2009.

Mahalanobis, Abhijit, "Transform Domain Adaptive Compressive Sensing of Specific Objects", Apr. 25, 2011, 9 pages, Visual Information Processing XX, Orlando, FL.

Lee et al., "A Compression-based Hybrid MLC/SLC Management Technique for Phase-Change Memory Systems" pp. 386-391, ISVLSI 2012, Amherst, MA, Aug. 19-21, 2012, 2012 IEEE Computer Society Annual Symposium VLSI.

Goh et al., "Chapter 13: Database Compression with Data Mining Methods" pp. 177-190, Information Organization and Databases, Springer Science & Business Media, 2000.New York, NY.

Lee et al., "Design and Evaluation of a Selective Compressed Memory System" pp. 184-191, ICCD 1999, Austin, TX, Oct. 10-13, 1999.

* cited by examiner

REAL-TIME CLASSIFICATION OF DATA INTO DATA COMPRESSION DOMAINS

BACKGROUND OF THE INVENTION

Field of the Invention

The present invention relates in general to computers, and more particularly to real-time classification of data into data compression domains in a computing environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

Data compression is widely used to reduce the amount of data required to process, transmit, or store a given quantity of information. Data compression is the coding of data to minimize its representation. Compression can be used, for example, to reduce the storage requirements for files, to increase the communication rate over a channel, or to reduce redundancy prior to encryption for greater security.

SUMMARY OF THE DESCRIBED EMBODIMENTS

In one embodiment, a method is provided for real-time classification of data into data compression domains using a processor device. For real-time classification of data into data compression domains, a decision is made for which of the data compression domains write operations should be forwarded by reading randomly selected data of the write operations for computing a set of classifying heuristics thereby creating a fingerprint for each of the write operations. The write operations having a similar fingerprint are compressed together in a similar compression stream.

In another embodiment, a computer system is provided for real-time classification of data into data compression domains. The computer system includes a computer-readable medium and a processor in operable communication with the computer-readable medium. For real-time classification of data into data compression domains, the processor decides which of the data compression domains write operations should be forward to by reading randomly selected data of the write operations for computing a set of classifying heuristics thereby creating a fingerprint for each of the write operations. The write operations having a similar fingerprint are compressed together in the same compression stream.

In a further embodiment, a computer program product is provided for real-time classification of data into data compression domains. The computer-readable storage medium has computer-readable program code portions stored thereon. The computer-readable program code portions include a first executable portion that decides which of the data compression domains write operations should be forward to by reading randomly selected data of the write operations for computing a set of classifying heuristics thereby creating a fingerprint for each of the write operations. The write operations having a similar fingerprint are compressed together in the same compression stream.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, computing systems are used to store and manage a variety of types of data. Compressing similar data using the same compression stream improves the compression ratio and reduces the required storage. However, when data is written, even in consecutive blocks in one file, the content is not always similar. For example, consider a document with images and text. If two separate compression streams are created for the document with images and text, and then sending each type of data to a separate compression stream, data compression is enhanced with greater efficiency and there is an improvement for the compression ratio of the overall data.

In a block storage system, data blocks are written to the storage without any indication what type of data is written, and no indication of relation between writes is given (e.g., writes of the same file and writes of the same type of data). Hence, when compressing write operation of the data, it is possible to compress together data, which has no common attributes (and no repetitions) and which will result in a degraded compression ratio. A block storage system has no information of the type (or class) of data written and cannot take advantage of that. Attempts to solve this challenge include an approach for block system by using spatial locality of the logical block address (LBA) space. Any writes to a given LBA range are compressed together, and this somewhat follows file system/database allocation strategy—allocating files or related files in a consecutive manner. Such an approach follows the popular heuristic that data in a single file is similar and should be compressed in a single compression stream—a heuristic that was found not to be always true thus data compression efficiency is reduced. As such, a need exists for a decision as to which compression stream to use should be done in real-time, otherwise it is not practical to use separate compression streams. Hence, a decision algorithm to select which compression stream to use should be fast (fast being a relative term and should be a fraction of the time required for compressing the data using the available hardware of the current state of the art).

Thus, in one embodiment, the present invention provides a solution for real-time classification of data into data compression domains using a processor device. For real-time classification of data into data compression domains, a decision is made for which of the data compression domains write operations should be forwarded by reading randomly selected data of the write operations for computing a set of classifying heuristics thereby creating a fingerprint for each of the write operations. The write operations having a similar fingerprint are compressed together in a similar compression stream.

As will be described below, in one embodiment, the present invention "detects" the "class" (or characteristics) of the data with no prior information (e.g., the compression domains or compression streams are classified). The present invention allows for writing to multiple compression streams based on domains of data. The present invention identifies and decides to which compression domain a write operation should be forward to and decides which compression stream to use. A compression domain may have one or more active compression streams. The detection method reads small fragments of the input data, which are randomly selected, and computes a set of classifying heuristics to create a fingerprint for the data. Data with similar fingerprints are compressed together in a single compression stream, while write operations that contain data with different fingerprint and characteristics (e.g., image versus text) will be split to different compression streams. Such classification and splitting of data increases efficiency and provides for a better use of a distributed system (i.e., multiple compression nodes) by allowing more nodes to assist in compressing the data by keeping similar data in a single stream, but utilizing multiple machines. The identification and detection algorithm is fast and does not need to compress the data in order to decide which compression domain and stream it should use.

Figure 1:
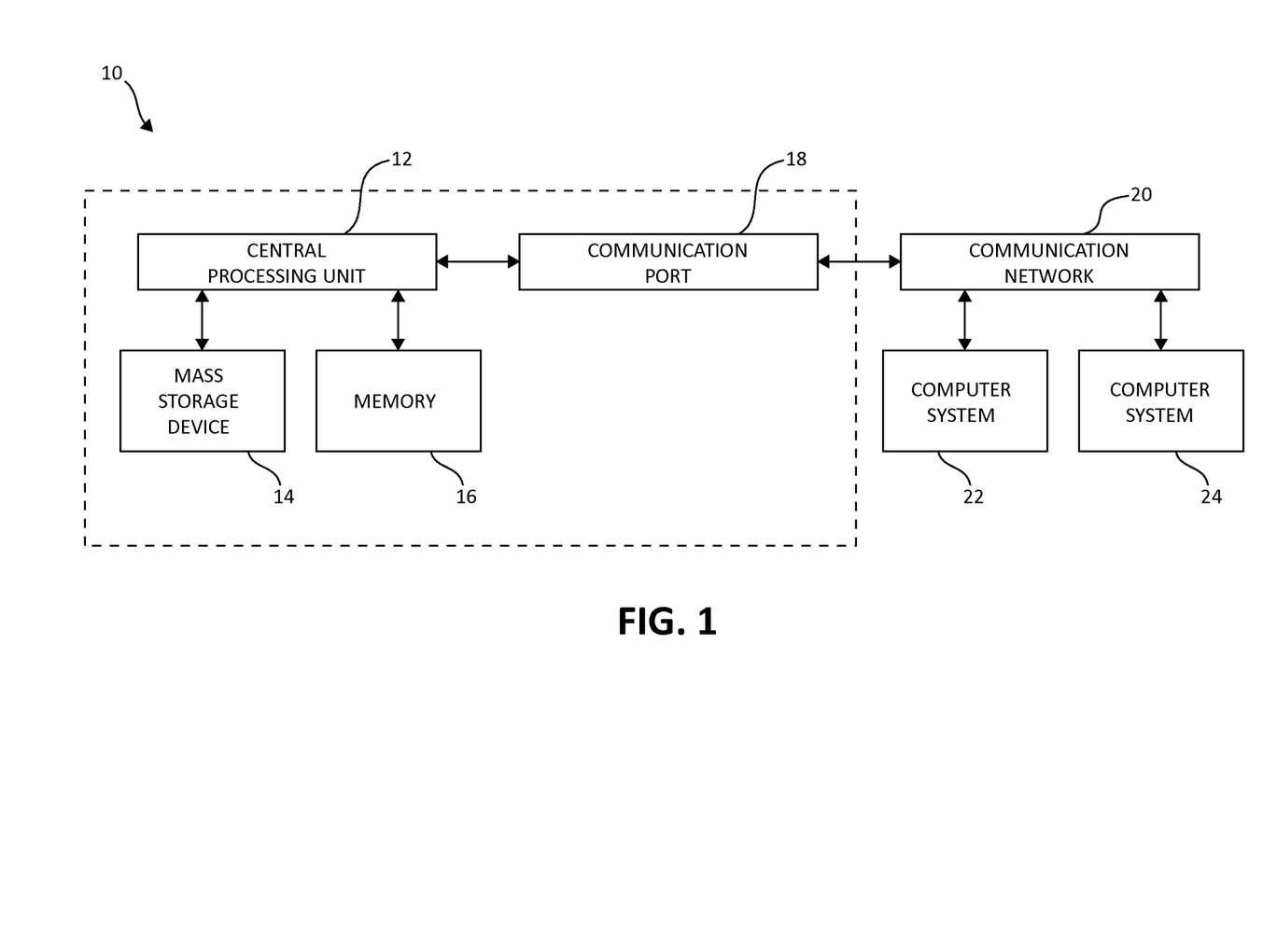
FIG. 1 is a block diagram illustrating a computer storage environment having an exemplary storage device in which aspects of the present invention may be realized.

Turning now to FIG. 1, exemplary architecture 10 of data storage systems in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
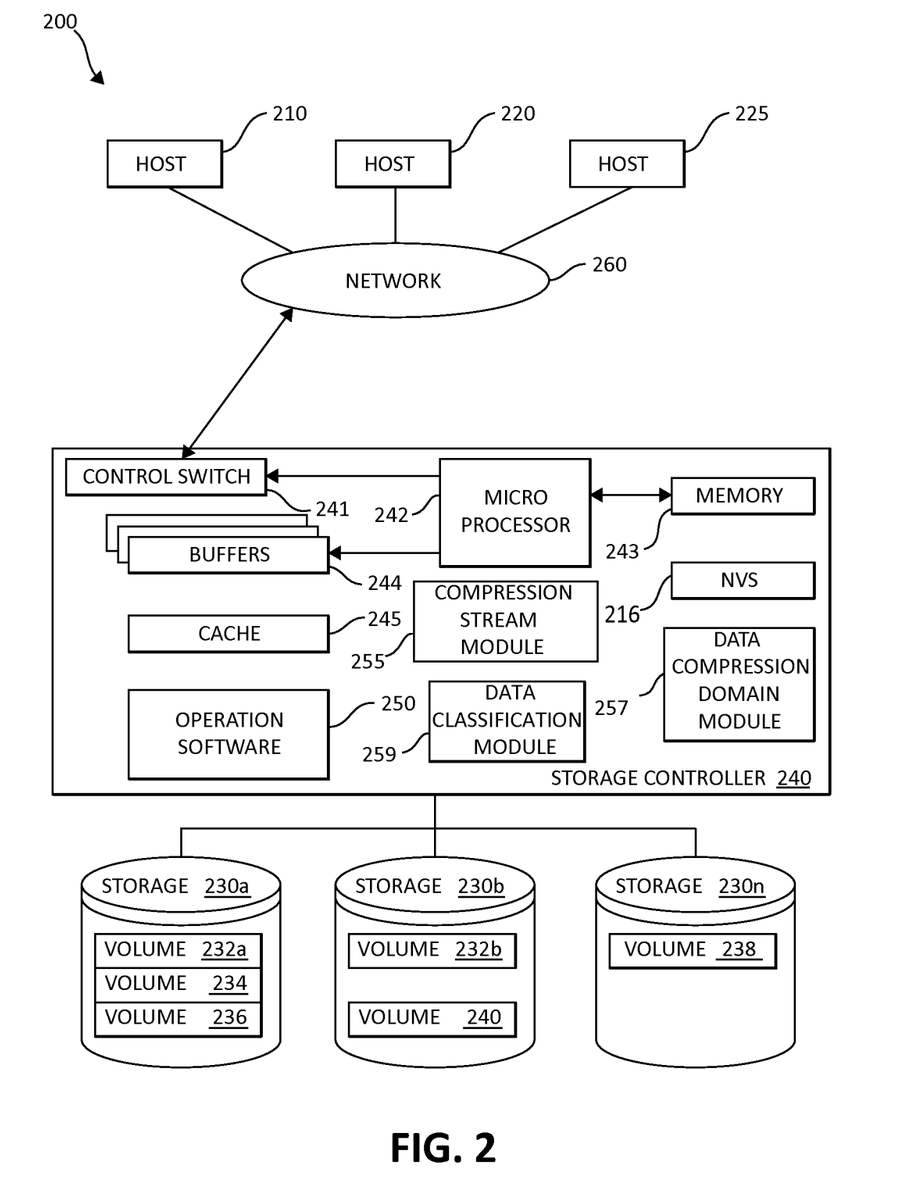
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computer storage environment. In one embodiment, system memory 243 includes, is associated, or is in communication with the operation software 250 in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be a given rank.

The storage controller 240 may include a compression stream module 255, an data compression domain module 257, and a data classification module 259 in a computer storage environment. The compression stream module 255, the data compression domain module 257, and the data classification module 259 may work in conjunction with each and every component of the storage controller 240, the hosts 210, 220, 225, and storage devices 230. The compression stream module 255, the data compression domain module 257, and the data classification module 259 may be structurally one complete module working together and in conjunction with each other for performing such functionality as described below, or may be individual modules. The compression stream module 255, the data compression domain module 257, and the data classification module 259 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, compression stream module 255, the data compression domain module 257, and the data classification module 259 on which information may be set. Multiple buffers 244 may be implemented with the present invention in a computing environment, or performing other functionality in accordance with the mechanisms of the illustrated embodiments.

In one embodiment, by way of example only, the host computers or one or more physical or virtual devices, 210, 220, 225 and the storage controller 240 are connected through a network adaptor (this could be a fiber channel) 260 as an interface i.e., via a switch sometimes referred to as "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, compression stream module 255, the data compression domain module 257, and the data classification module 259 are in communication with each other and may be separate or one individual component(s). Also, several, if not all of the components, such as the operation software 245 may be included with the memory 243 in a computer storage environment. Each of the components within the storage device may be linked together and may be in communication with each other for purposes suited to the present invention.

Figure 3:
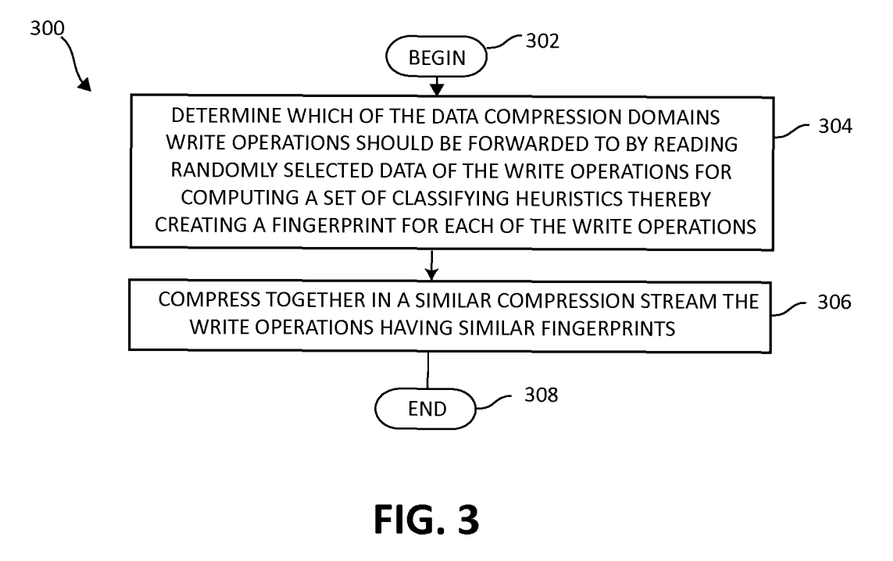
FIG. 3 is a flow chart diagram illustrating an exemplary method for real-time classification of data into data compression domains in which aspects of the present invention may be realized.

Turning now to FIG. 3, an exemplary method 300 for real-time classification of data into data compression domains is illustrated. The method 300 begins (step 302) by deciding which of the data compression domains write operations should be forward to by reading randomly selected data of the write operations for computing a set of classifying heuristics thereby creating a fingerprint for each of the write operations (step 304). The method 300 compresses together in a compression stream those of the write operations having a similar fingerprint (step 306). The method 300 ends (step 308).

Figure 4:
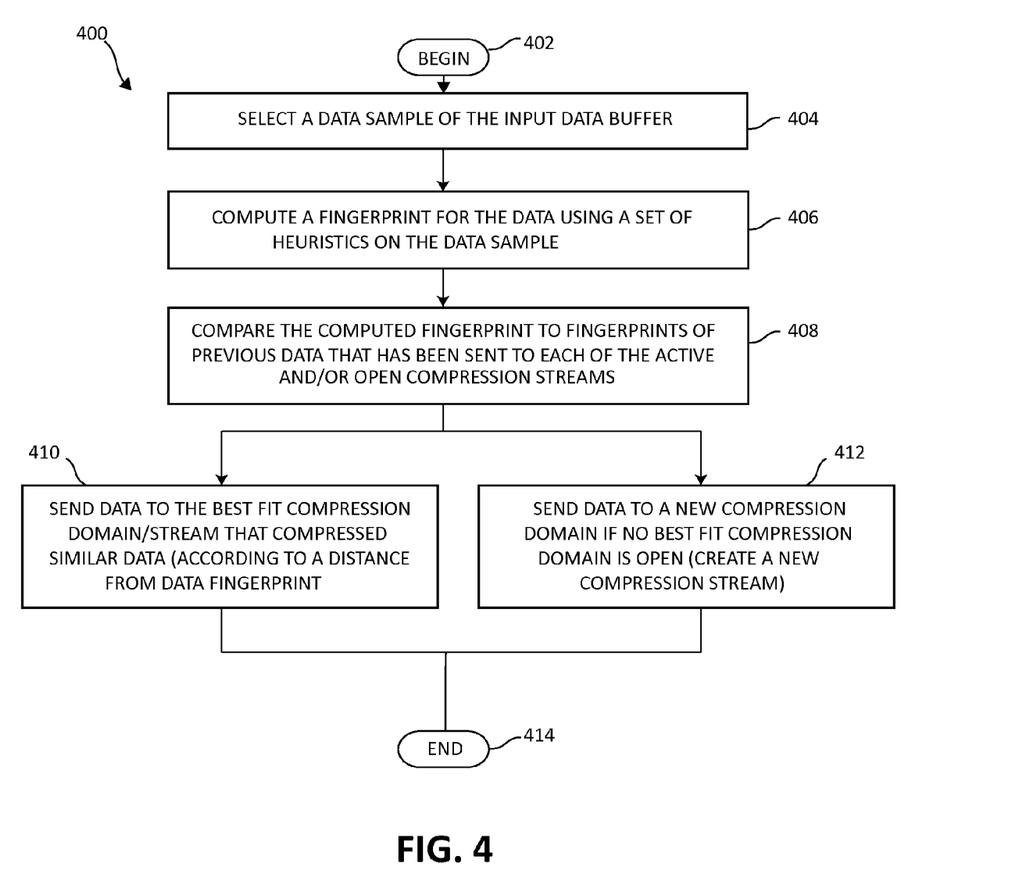
FIG. 4 is a flow chart diagram illustrating an additional exemplary method for real-time classification of data into data compression domains in which aspects of the present invention may be realized.

Based upon the foregoing, turning now to FIG. 4, an additional exemplary method 400 for real-time classification of data into data compression domains is depicted. For identifying and deciding which compression domains a write operation should be forward to and for deciding which compression stream to use, as described in FIG. 3, the method 400 begins (step 402) by selecting a data sample (e.g., a small data sample that may be a predetermined size that may be defined by a user) of the input data buffer (step 404). In one embodiment, the input data buffer can be an application file or a data block. Also, the selected data sample may be the entire input buffer, randomly selected (or predefined) sequences of bytes from the buffer of a predefined, or may be of an adaptive size (e.g., adaptive to the data sampled thus far).

The method 400 computes a fingerprint for the data using the set of heuristics on the data sample (step 406). The heuristics can be computed very fast (fast being a relative term as compared to the time required for compression) and the heuristics are able to indicate what data should be compressed together and what data should not be compressed together. The computed fingerprint is compared to the fingerprints of previous data that have been sent to each of the active/open compression streams (step 408). Based upon the comparison, data is sent to the best-fit compression domain/stream that compressed similar data (according to distance from data fingerprint) (step 410). The term distance refers to the degree of similarity between the fingerprints. For example, computing the hamming distance between the current fingerprint and the fingerprints of the date compressed by each of the compression domains/streams, and selecting the stream will the smallest distance. The distance between the fingerprints can be computed as distance vector, or any other mathematical vector distance functions. Alternatively, the method 400 may send the data to a new compression domain if there is no best-fit compression domain is active/open (e.g., a new compression stream is created) (step 412). The method 400 ends (step 414).

In one embodiment, the fingerprint heuristic can be one of any of and/or a combination of the following examples: (1) the entropy of the sampled data; (2) the core character set (coreset)—the set (and size) of characters that compose the majority (which is determined as a predefined percentage) of the bytes in the sample. For example, the set of characters that compose 90% of the sample; (3) full or partial histogram of the sample date or corset, including compact form (less bits for counting) of the histogram count; (4) Groups of dominant or non-dominant characters from the sample; (5) a mean, a variance, and/or a different moment of the histogram or corset; and (6) an indication of the data structure found in the data. For example, the presence of a header (joint photographic experts group (JPEG)/graphics interchange format (GIF) headers), structure of the data or the presence of delimiters.

In one embodiment, an additional option for the fingerprinting heuristic is to use some Similarity Preserving Hash (SPH) methods. SPH is a function over a dataset, or part of the dataset, in which datasets that has common strings, also has similar value. For example in computing the core-set, the present invention may regard the core-set as a 256-long bit vector (assuming the core-set are characters) and apply some error correcting code (ECC) on the core-set. Thus if, for example, in one file the core-set is A-Z and in another is A-Z without J, then such an ECC would find them similar. It should also be noted that compression domains may be on a single machine, or on multiple machines working together to compress the data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for real-time classification of data into data compression domains by a processor device in a computing environment, the method comprising:
    deciding, by a plurality of nodes, which of the data compression domains write operations should be forwarded to by reading randomly selected data of the write operations for computing a set of classifying heuristics thereby creating a fingerprint for each of the write operations;
    compressing together, by the plurality of nodes, in a compression stream those of the write operations having a similar fingerprint;
        wherein computing the set of classifying heuristics includes using a combination of all of the heuristics: entropy of the randomly selected data, a core character set and size of character that compose a majority of bytes in the randomly selected data, a full or partial histogram of the randomly selected data or the core character set, groups of dominant characters or groups of non-dominant characters of the randomly selected data, one of a mean, a variance, and an alternative moment of the full or partial histogram or the core character set, and an indication of a data structure of the data; and
    splitting the write operations having different fingerprints into different compression streams.

2. The method of claim 1, further including comparing each of the fingerprints for each of the write operations to those of the write operations that were previously forwarded to each of the data compression domains.

3. The method of claim 2, further including sending the write operations having the similar fingerprint to the data compression domain compressing similar data of the write operations.

4. The method of claim 3, further including sending the write operation to a new data compression domain, wherein a new compression stream is created.

5. The method of claim 1, further including using a Similarity Preserving Hash (SPH) for computing the set of classifying heuristics.

6. A system for real-time classification of data into data compression domains in a computing environment, the system comprising:
    a processor device operable in the computing storage environment, wherein the processor device:
        decides, by a plurality of nodes, which of the data compression domains write operations should be forwarded to by reading randomly selected data of the write operations for computing a set of classifying heuristics thereby creating a fingerprint for each of the write operations,
        compresses together, by the plurality of nodes, in a compression stream those of the write operations having a similar fingerprint;
            wherein the processor device, for computing the set of classifying heuristics, uses a combination of all of the heuristics: entropy of the randomly selected data, a core character set and size of character that compose a majority of bytes in the randomly selected data, a full or partial histogram of the randomly selected data or the core character set, groups of dominant characters or groups of non-dominant characters of the randomly selected data, one of a mean, a variance, and an alternative moment of the full or partial histogram or the core character set, and an indication of a data structure of the data, and
        splits the write operations having different fingerprints into different compression streams.

7. The system of claim 6, wherein the processor device compares each of the fingerprints for each of the write operations to those of the write operations that were previously forwarded to each of the data compression domains.

8. The system of claim 7, wherein the processor device sends the write operations having the similar fingerprint to the data compression domain compressing similar data of the write operations.

9. The system of claim 8, wherein the processor device sends the write operation to a new data compression domain, wherein a new compression stream is created.

10. The system of claim 6, wherein the processor device uses a Similarity Preserving Hash (SPH) for computing the set of classifying heuristics.

11. A computer program product real-time classification of data into data compression domains by a processor device, the computer program product comprising a non-transitory computer-readable storage medium having computer-readable program code portions stored therein, the computer-readable program code portions comprising:
    a first executable portion decides, by a plurality of nodes, which of the data compression domains write operations should be forwarded to by reading randomly selected data of the write operations for computing a set of classifying heuristics thereby creating a fingerprint for each of the write operations;
    a second executable portion that compresses together, by the plurality of nodes, in a compression stream those of the write operations having a similar fingerprint;
        wherein computing a set of classifying heuristics includes a combination of all of: an entropy of the randomly elected data, a core character set and size of character that compose a majority of bytes in the randomly selected data, a full or partial histogram of the randomly selected data or the core character set, groups of dominant characters or groups of non-dominant characters of the randomly selected data, one of a mean, a variance, and an alternative moment of the full or partial histogram or the core character set, and an indication of a data structure of the data; and a third executable portion that splits the write operations having different fingerprints into different compression streams.

12. The computer program product of claim 11, further including a fourth executable portion that compares each of the fingerprints for each of the write operations to those of the write operations that were previously forwarded to each of the data compression domains.

13. The computer program product of claim 12, further including a fifth executable portion that sends the write operations having the similar fingerprint to the data compression domain compressing similar data of the write operations.

14. The computer program product of claim 13, further including a sixth executable portion that sends the write operation to a new data compression domain, wherein a new compression stream is created.

15. The computer program product of claim 11, further including a fourth executable portion that uses a Similarity Preserving Hash (SPH) for computing the set of classifying heuristics.

* * * * *